United States Patent [19]

Siebert

[11] 4,341,168

[45] Jul. 27, 1982

[54] SYSTEM FOR APPLYING AMMONIA TO THE GROUND

[76] Inventor: Louie P. Siebert, Box 654, Henderson, Nebr. 68371

[21] Appl. No.: 262,348

[22] Filed: May 11, 1981

Related U.S. Application Data

[63] Continuation-in-part of Ser. No. 91,363, Nov. 5, 1979, which is a continuation of Ser. No. 787,947, Apr. 15, 1977, Pat. No. 4,196,677.

[51] Int. Cl.³ ............................................. A01C 23/00
[52] U.S. Cl. ........................................................ 111/7
[58] Field of Search ....................................... 111/6, 7

[56] References Cited

U.S. PATENT DOCUMENTS

| | | | |
|---|---|---|---|
| 2,857,863 | 10/1958 | Jessen | 111/7 |
| 3,372,658 | 3/1968 | Ammann | 111/7 |
| 3,978,681 | 9/1976 | Kjelgaard et al. | 111/7 |
| 4,069,029 | 1/1978 | Hudson | 111/7 X |
| 4,116,139 | 9/1978 | Sauer | 111/7 |
| 4,196,677 | 4/1980 | Siebert | 111/7 |
| 4,202,283 | 5/1980 | Wiesboeck | 111/7 X |

*Primary Examiner*—James R. Feyrer

*Attorney, Agent, or Firm*—Zarley, McKee, Thomte, Voorhees & Sease

[57] ABSTRACT

An implement is provided for applying ammonia to the ground including a nurse tank feeding individual converters on each ground-working plow with each converter having an expansion cannister into which the gas is fed at the top and from which liquid is discharged from the bottom through a liquid outlet opening and fed to the ground. A plurality of baffles divide each expansion cannister into a plurality of expansion chambers. The liquid outlet openings of the cannisters are positioned above and adjacent the ground-working lower end portions of the respective ground plows to minimize the travel distance of depressurized liquid ammonia from the outlet openings to the ground. Each cannister is further provided with a vent opening for discharging ammonia vapor to the ground, the size of the vent opening being related to the volume of the cannister such that cold liquid ammonia will be discharged from the liquid outlet opening at approximately 2-4 psi. A liquid conduit in communication with the liquid outlet opening terminates behind and closely adjacent the lower end portion of the respective ground plow.

15 Claims, 5 Drawing Figures

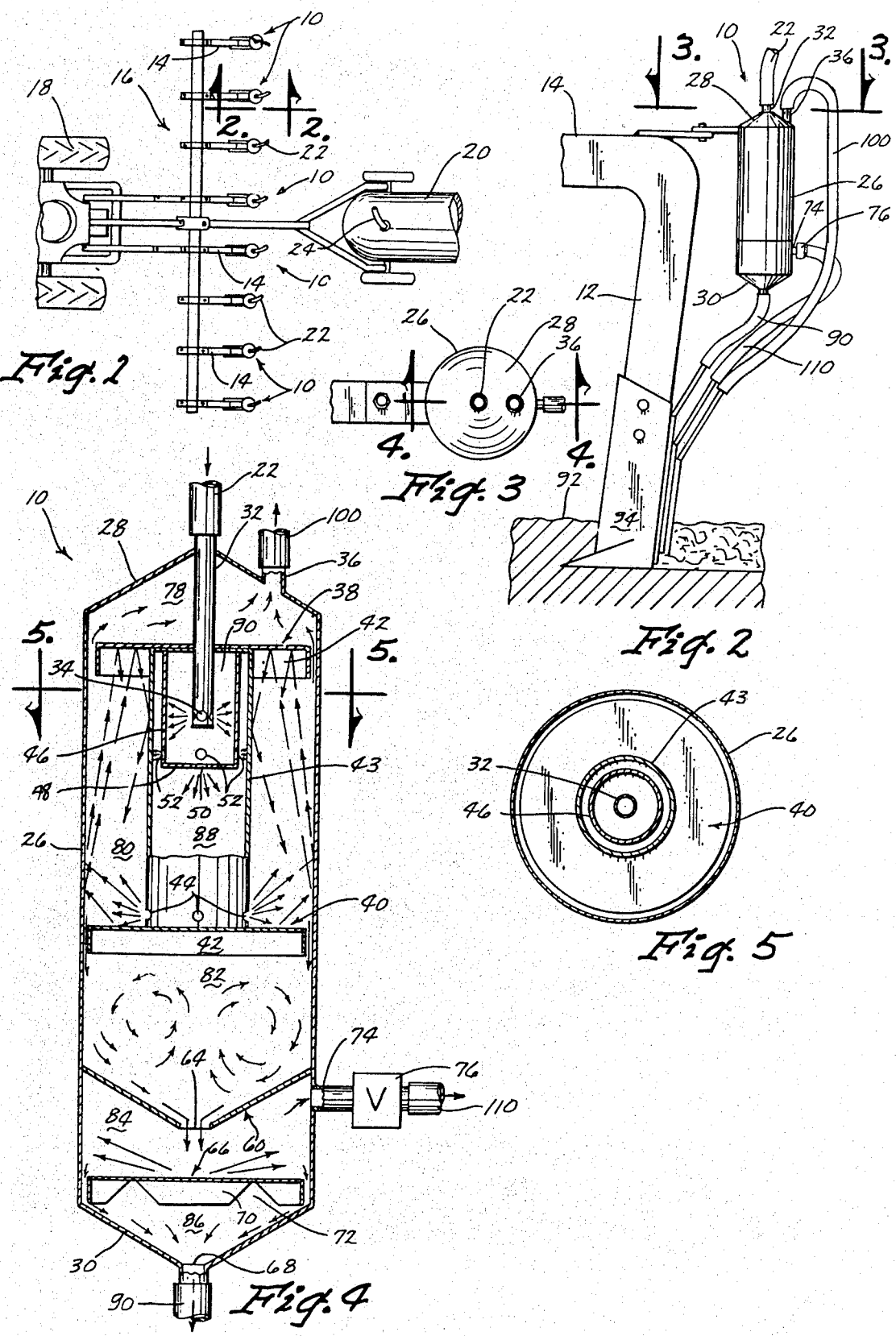

SYSTEM FOR APPLYING AMMONIA TO THE GROUND

CROSS REFERENCE TO RELATED APPLICATION

This is a continuation-in-part of my previous United States patent application Ser. No. 91,363 filed Nov. 5, 1979, which is a continuation of Ser. No. 787,947 filed on Apr. 15, 1977, which issued as U.S. Pat. No. 4,196,677 on Apr. 8, 1980.

BACKGROUND OF THE INVENTION

This invention relates to an improved implement for applying liquid ammonia to the ground over that disclosed in U.S. Pat. Nos. 3,978,681 and 2,612,760. In the conversion of gas ammonia to liquid for application to the ground, it is desired that as much as possible of the gas be converted to liquid due to the high vaporization of gas and possible loss to the atmosphere upon discharge from the applicator. The location of the conversion unit relative to the point of application in the ground and the specific construction of the converter expansion cannister affect the efficiency of the gas to liquid conversion process and thus the effective utilization of ammonia supplied from a nurse tank.

Prior farm implements for applying cold liquid ammonia to the ground have included a single elevated converter unit from which the cold liquid ammonia is discharged by gravity flow to a plurality of ground working tools. Such gravity flow, however, results in nonuniform distribution of ammonia to the tools depending upon the inclination of the ground traversed by the implement. Another problem is to discharge both the cold liquid ammonia and ammonia vapor in a way that it will be incorporated into the ground with minimum loss to the atmosphere. Finally, those implements wherein liquid ammonia is distributed to a plurality of ground tools from a single anhydrous converter provide no indication when any selected one of the discharge conduits becomes plugged.

SUMMARY OF THE INVENTION

In accordance with the present invention a nurse tank is provided on the applicator implement and it feeds individual converter units associated with each plow for each row whereby the liquid ammonia travels a very short distance after being converted from gas to liquid in the converter. Additiionally, the specific internal construction of the converter facilities the more efficient conversion process by appropriate circulation of the gas within the expansion cannister to provide maximum liquid as the end product of the process.

Specifically, the gas ammonia is fed into the top end of the cannister which has oppositely facing conical ends. The inlet tube is received in a pair of concentric sleeves which discharge the gas from the first sleeve laterally outwardly into the second sleeve which in turn discharges the gas laterally outwardly into the cannister against the side walls where it is deflected upwardly against a top baffle of a pair of baffles and then downwardly against the bottom baffle of the pair of baffles. The pair of baffles have downwardly extending flanges past which the gas and fluid flow into a chamber above a conical baffle having an axial opening. The gas is circulated turbulently between the bottom baffle of the pair of baffles and the conical baffle and then discharged as liquid onto an outlet baffle just above the cannister outlet opening. The outlet baffle has a downwardly extending peripheral flange which has inverted notches for breaking up any vacuum that might tend to hold up flow of the fluid from the cannister. The cannister is vented at the top conical end wall and between the conical baffle and the outlet baffle with conduits connecting the vents to the plows for utilization of the gas in the ground. A control valve is provided on the bottom vent for varying the pressure on the liquid being discharged from the cannister since a certain amount of pressure may be necessary on a field cultivator, for example, to keep the liquid tubes free of soil. Also, temperature variations can cause a variance in tank pressure. Ordinarily, it is not desirable to apply the ammonia to the soil under substantial pressure and thus the vents are provided for relieving this vapor pressure.

In the present invention, the area of the vent opening is selected in relation to the volume of the cannister so that cold liquid ammonia will be discharged from the liquid outlet opening at approximately 2-4 pounds per square inch. This minimal liquid discharge pressure from each of the plurality of converter units assures a uniform application of ammonia to the ground regardless of any surface inclinations in the field traversed by the implement. The placement of the terminal end of the liquid conduit at the heel of the ground plow with the terminal end of the vent opening being positioned above and behind the terminal end of the liquid conduit maximizes the incorporation of the discharged ammonia liquid and vapor into the ground. Ordinarily, the individual converter units will be cold and covered with frost during operation. As a result, if an individual converter unit thaws, an indication is provided that the flow of ammonia from that unit has been obstructed.

DESCRIPTION OF THE DRAWINGS

FIG. 1 is a fragmentary top plan view of a field implement including a nurse tank feeding a plurality of individual converter units positioned closely adjacent the point of application to the ground.

FIG. 2 is a side elevation view taken along line 2—2 in FIG. 1, and showing the location of the converter unit on the ground-engaging plow tool.

FIG. 3 is a top plan view taken along line 3—3 in FIG. 2.

FIG. 4 is an enlarged vertical cross-sectional view of the converter unit.

FIG. 5 is a cross-sectional view taken along line 5—5 in FIG. 4.

DETAILED DESCRIPTION OF THE INVENTION

The anhydrous converter of this invention is referred to generally in FIG. 4 by the reference numeral 10 and is shown mounted on the vertical shank 12 of an implement frame 14 of an implement 16 pulled by a tractor 18. A nurse tank 20 is pulled behind the implement 16 and supplies ammonia gas to the individual converter units 10 through tubes 22 connected to a tube 24 on the nurse tank 20.

The converter unit 10 is shown in detail in FIGS. 4 and 5 and includes an elongated cylindrical cannister 26 having oppositely facing top and bottom conical ends 28 and 30. An inlet tube 32 extends through the axial center of the end 28 and has a plurality of side wall openings 34 while the axial end of the tube is closed. A vent opening 36 is provided in the top end wall 28 between the cannister side wall and the axial center of the cannister.

The upper end of the cannister includes a pair of spaced apart flat baffles 38 and 40 having downwardly extending flanges 42 in close proximity to the cannister side wall. A first sleeve 43 is fixed at its opposite ends to the axial center of the baffles 38 and 40 includes lateral discharge openings 44 closely adjacent the bottom baffle 40. A second sleeve 46 is spaced from the first sleeve 43 along its side wall and includes a bottom end wall 48 positioned at approximately midway along the length of the first sleeve 43 and includes an axial discharge opening 50 and side openings 52. A conical baffle 60 is positioned below the bottom flat baffle 40 and is fixed to the cannister side wall around its peripheral edge but includes an axial opening 64. An outlet baffle 66 is positioned between the conical baffle 60 and the conical end wall 30 of the cannister 10 over a discharge opening 68 in the conical end wall 30. The outlet baffle 66 includes a downwardly extending peripheral flange 70 having inverted V-shaped notches 72 for preventing the formation of a vacuum at the discharge end of the cannister which would retard or prevent discharge of liquid ammonia from the cannister. A vent 74 is provided in the cannister side wall between the outlet baffle 66 and the conical baffle 60 and includes a metering valve 76 for varying the pressure applied to the liquid being discharged from the outlet opening 68.

Thus it is seen that a first chamber 78 is formed between the top flat baffle 38 and the top end wall 28. A second chamber 80 is provided between the pair of flat baffles 38 and 40 with a third chamber 82 being defined by the bottom baffle 40 and the conical baffle 60. The outlet baffle 66 cooperates with the conical baffle to define a fourth chamber 84 and the bottom conical end wall 30 and the outlet baffle 66 define a final fifth chamber 86 from which the liquid is discharged through the outlet axial opening 68.

In addition to the major expansion chambers 78, 80, 82, 84 and 86 are the chambers 88 and 90 within the first and second sleeves 43 and 46, respectively.

Thus it is seen in operation that ammonia at a temperature of minus 28° F. in liquid form under very little pressure is discharged through outlet 68 into tube 90 for deposit into the ground 92 behind plow share 94. In the past ammonia gas was applied to the soil under pressure which had to be knifed into a depth of about six to eight inches depending on soil conditions. With the expansion of the gas to liquid through the use of the converter unit 10 the ammonia gas is reduced in temperature and decompressed and thus it is possible to apply the ammonia to the soil at a depth of about two to three inches below the soil surface thus saving energy and gaining the application of ammonia close to the surface of the earth where it can give greater nutrition to the root zone of the crop. Ammonia travels down with the moisture and is soon out of reach of the root zone and thus lost whereupon it may enter the water table and provide possible water contamination.

Ammonia stored in the nurse tank 20 will be stored under pressures up to 100 p.s.i. with the average pressure being approximately 50 to 75 pounds. When the ammonia is released to the atmosphere or allowed to expand it cools very rapidly causing a refrigeration action. As ammonia cools it looses its pressurization. It will cool to minus 28° F. and goes into a liquid state at 0° pressure. Maximization of the decompression is accomplished through the travel of the gas through the series of chambers and baffles to retard or contain the flow of ammonia sufficiently long to allow it to cool and separate the liquid from any remaining gas.

Under ideal conditions, the operation of the conversion unit is as follows. Whereas ideal conditions can be assured only in a laboratory setting, they will be closely approached in the field on a favorable day when the air temperature is approximately 75° F., the ground temperature is approximately 60° F.–65° F. and the nurse tank pressure is approximately 100 psi.

The ammonia enters the unit at chamber 90 at approximately 16 psi and leaves and enters chamber 88 through openings 50 and 52 with the pressure having dropped to approximately 12 psi. The ammonia now leaves the chamber 88 through the openings 44 above the baffle 40 and enters chamber 80. On entering chamber 80 ammonia has almost reached minus 28° F. and has dropped in pressure to 2 psi and the vapor is now separating from the liquid. As the vapor rises to the top, it is deflected by baffle 38. This action accomplishes two things. It retards the flowing action which results in separation of the liquid from vapor thus the liquid flows downward as the vapor ascends to the vapor exhaust port 36. This vapor is then piped through the tube 100 which feeds it to the ground. The liquid then flows down by gravity flow around the baffle 40 taking some of the vapor with it and maintaining a 2 psi. This action is now being contained by the conical baffle 60 which functions as a drain baffle which deflects liquid downwardly and guides the liquid towards the center opening 64 into chamber 84. This liquid mixed with some vapor rotates in chamber 82 also causing a cooling action and thus separating the liquid and vapor before entering chamber 84. The liquid now being heavier than the vapor flows into chamber 84 dropping the pressure to zero by allowing the balance of the vapor and pressure to leave through the vent 74. Liquid now has dropped onto the outlet baffle 66 freeing itself from the balance of vapor and it flows down around baffle 66 and out the bottom outlet opening 68. The outlet baffle 66 being cupped and facing downwardly and having notches 72 cut in the sides of the flange 70 serves to break up any vacuum that might be created by the downward flow of the heavy liquid. Were it not for these notches a vacuum which might be created would cause a vapor lock and would stall the flow of liquid and would thereby cause the liquid to back up and overflow out the vents 36 and 74. The vapor leaving the vent 74 is also fed to the soil through a tube 110. The liquid ammonia, as previously indicated, may be fed to the soil by gravity out through the bottom opening 68 and the tube 90.

It is to be understood that field conditions will vary rather substantially just from morning to afternoon, let alone from day to day. To accommodate varying ambient conditions including varying pressures of the ammonia within the nurse tank, control valve 76 on the lower vent 74 will generally be closed to an extent to provide for the discharge of liquid ammonia from bottom opening 68 at a pressure of between 2 and 4 psi. This minimal liquid discharge pressure will effectively assist in accomplishing uniform distribution of cold liquid ammonia from the plurality of converter units.

The pressure of the liquid at the point of discharge is largely determined by the area of the vent opening 36 when the control valve 76 is closed. It has been found that a vent opening of one-half inch diameter on a 12 inch long, 4 inch diameter cylindrical cannister will produce the desired liquid discharge pressure of between 2 and 4 psi. Upon opening of control valve 76 under ideal conditions, however, it is possible to reduce the liquid discharge pressure as discussed above.

To assure maximum incorporation of the discharged ammonia liquid and vapor, the terminal end of the liquid discharge conduit terminates adjacent and closely behind the lower end portion 94 of ground plow 12. Specifically, if the lower end portion 94 is seen as including a forward toe portion and rearward heel portion, the liquid discharge conduit preferably terminates at the heel portion as shown in FIG. 2. The vapor discharge conduits 100 and 110 are similarly arranged behind the lower end portion 94 in vertically spaced relation above, by about one inch, and behind the terminal end of the liquid discharge conduit 90, also as seen in FIG. 2. The arrangement of the terminal end of the vapor discharge conduit above and behind the terminal end of the liquid discharge conduit maximizes the incorporation of both the liquid and vapor into the ground.

When the implement is operating properly, each of the cannisters 26 will be very cold and coated with frost. Whenever the flow of ammonia through a particular converter unit is obstructed for any reason, that cannister will rather rapidly thaw. Obstructions can be caused by dirt entering the terminal ends of the discharge conduits or by obstructions in the flow of pressurized ammonia to the individual converter unit. In any event, a thawing of the frost coating on any individual cannister will provide a readily apparent indication that the flow of ammonia from the associated tool is being obstructed. By painting the cannisters a dark or bright color such as red, the contrast with the white frost can be maximized.

Thus there has been described an apparatus and method for applying ammonia to the ground.

I claim:

1. An implement for row application of cold liquid ammonia to the ground comprising,
    an implement frame having a plurality of ground plows having ground working lower end portions,
    a nurse tank connected to said frame adapted for containing pressurized ammonia,
    a plurality of anhydrous converters, each operatively associated with a respective ground plow and adapted to convert said pressurized ammonia to cold depressurized liquid ammonia,
    each converter comprising a generally cylindrical expansion cannister having a side wall and top and bottom ends with an inlet opening in the top end and an outlet opening in the bottom end and a plurality of spaced apart baffles within said cannister defining a plurality of expansion chambers between said baffles and top and bottom ends, said chambers being interconnected for the flow of ammonia from said inlet opening through said chambers and outwardly through said outlet opening, a supply conduit connecting said inlet opening to said nurse tank for receiving ammonia therefrom, and a single liquid discharge conduit having only two ends, one of said ends being in communication with said outlet opening and the other of said ends terminating adjacent and closely behind said lower end portion of a respective ground plow for transmission of liquid ammonia to the ground, said outlet openings of said converters being positioned above and adjacent said lower end portions of the respective ground plows, thereby to minimize the travel distance of depressurized liquid ammonia from said outlet openings to the ground,
    a vent opening being provided in each cannister in communication with one of said chambers therein at a position vertically spaced from said outlet opening, and
    a vapor conduit communicating at one end with said vent opening and terminating at the other end thereof closely adjacent and behind said lower end portion of a respective ground plow for transmission of gas ammonia into the ground.

2. The implement of claim 1 wherein the other end of said vapor conduit terminates at a position behind said other end of the liquid discharge conduit.

3. The implement of claim 2 wherein the other end of said vapor conduit terminates at a position in vertically spaced relation above said other end of the liquid discharge conduit.

4. The implement of claim 3 wherein the other end of said vapor conduit terminates approximately one inch above the other end of said liquid discharge conduit.

5. The implement of claim 2 wherein said ground working lower end portion of the ground plow defines a forward toe portion and a rearward heel portion, the other end of said liquid discharge conduit terminating approximately at said heel portion.

6. The implement of claim 1 wherein the area of said vent opening is proportionally related to the volume of said cannister such that cold liquid ammonia will be discharged from said liquid outlet opening at approximately 2–4 psi in response to the introduction of pressurized ammonia into said inlet opening.

7. The implement of claim 6 wherein the proportional relationship between the area of said vent opening and the volume of said cannister is approximately equal to the proportional relationship of the area of one-half inch diameter opening to the volume of a twelve inch long, four inch diameter cylinder.

8. The implement of claim 6 further comprising a second vent opening in said cannister at a position below said aforementioned vent opening and a control valve associated with said second vent opening for regulating the discharge pressure of cold liquid ammonia passing from said cannister through said outlet opening.

9. A method of row application of cold liquid ammonia to the ground comprising,
    providing an implement frame having a plurality of ground plows having ground working lower end portions, a plurality of anhydrous converters, each operatively associated with a respective ground plow and including an inlet opening, a liquid outlet opening and a vapor outlet opening, and a nurse tank containing pressurized ammonia operatively connected to said inlet openings for supplying pressurized ammonia thereto,
    positioning the anhydrous converters on said frame such that the liquid outlet openings thereof are arranged above and adjacent the lower end portions of the respective ground plows,
    converting pressurized ammonia from said nurse tank to cold depressurized liquid ammonia in said anhydrous converters,
    discharging cold depressurized liquid ammonia from said liquid outlet openings through respective liquid conduits terminating at positions closely adjacent and behind the lower end portions of the respective ground plows, and discharging ammonia vapor from said vapor outlet openings through respective conduits terminating at positions closely adjacent and behind the terminal ends of said respective liquid conduits.

10. The method of claim 9 wherein the ammonia vapor is discharged at positions above and behind the terminal ends of the respective liquid conduits.

11. The method of claim 9 wherein said cold depressurized liquid ammonia is discharged at a pressure of approximately 2 to 4 psi.

12. The method of claim 11 wherein said ammonia vapor is discharged at a pressure of approximately 5 to 15 psi.

13. An implement for row application of cold liquid ammonia to the ground comprising, an implement frame having a plurality of ground plows having ground working lower end portions, a nurse tank on said frame adapted for containing pressurized ammonia, a plurality of anhydrous converters, each operatively associated with a respective ground plow and adapted to convert said pressurized ammonia to cold depressurized liquid ammonia, each converter comprising a generally cylindrical expansion cannister having a side wall and top and bottom ends with an inlet opening in the top end and an outlet opening in the bottom end and a plurality of spaced apart baffles within said cannister defining a plurality of expansion chambers between said baffles and top and bottom ends, said chambers being interconnected for the flow of ammonia from said inlet opening through said chambers and outwardly through said outlet opening, a supply conduit connecting said inlet opening to said nurse tank for receiving ammonia therefrom, and a single discharge conduit having only two ends, one of said ends being in communication with said outlet opening and the other of said ends terminating adjacent said lower end portion of a respective ground plow for transmission of ammonia into the ground, said outlet openings of said converters being positioned above and adjacent said lower end portions of the respective ground plows, thereby to minimize the travel distance of depressurized liquid ammonia from said outlet openings to the ground, a vent opening being provided in each converter in communication with one of said chambers therein at a position vertically spaced from said outlet opening, and a second conduit communicating at one end with said vent opening and terminating at the other end thereof adjacent the ground for transmission of gas ammonia into the ground, the area of said vent opening being related ot the volume of said cannister such that cold liquid ammonia will be discharged from said liquid outlet opening at approximately 2–4 psi in response to the introduction of pressurized ammonia into said inlet opening.

14. The implement of claim 13 wherein the relationship between the area of said vent opening and the volume of said cannister is approximately equal to the proportional relationship of the area of a one-half inch diameter opening to the volume of a twelve inch long, four inch diameter cylinder.

15. The implement of claim 13 further comprising a second vent opening in said cannister at a position below said aforementioned vent opening and a control valve associated with said second vent opening for regulating the discharge pressure of cold liquid ammonia passing from said cannister through said outlet opening.

* * * * *